United States Patent
Taniuchi et al.

(10) Patent No.: US 11,450,882 B2
(45) Date of Patent: Sep. 20, 2022

(54) ALL-SOLID-STATE BATTERY CELL

(71) Applicant: Honda Motor Co., Ltd., Tokyo (JP)

(72) Inventors: Takuya Taniuchi, Saitama (JP); Masahiro Ohta, Saitama (JP); Kenta Fukami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 243 days.

(21) Appl. No.: 16/742,871

(22) Filed: Jan. 14, 2020

(65) Prior Publication Data
US 2020/0227777 A1    Jul. 16, 2020

(30) Foreign Application Priority Data

Jan. 16, 2019 (JP) ................ JP2019-005013

(51) Int. Cl.
| | | |
|---|---|---|
| *H01M 10/0562* | (2010.01) | |
| *H01M 10/613* | (2014.01) | |
| *H01M 10/653* | (2014.01) | |
| *H01M 50/502* | (2021.01) | |

(52) U.S. Cl.
CPC ..... *H01M 10/0562* (2013.01); *H01M 10/613* (2015.04); *H01M 10/653* (2015.04); *H01M 50/502* (2021.01)

(58) Field of Classification Search
CPC ......... H01M 10/0562; H01M 10/0585; H01M 10/613; H01M 10/653; H01M 10/654; H01M 10/6553; H01M 10/6554; H01M 2300/0065; H01M 50/502; Y02E 60/10; Y02P 70/50

See application file for complete search history.

(56) References Cited

U.S. PATENT DOCUMENTS

| | | | | |
|---|---|---|---|---|
| 2011/0039134 A1* | 2/2011 | Kim | .......... | H01M 10/653 429/7 |
| 2012/0308869 A1* | 12/2012 | Obasih | .......... | H01M 10/0431 429/120 |

FOREIGN PATENT DOCUMENTS

| | | |
|---|---|---|
| JP | 2000106154 | 4/2000 |
| JP | 2012059361 | 3/2012 |
| JP | 2013069455 | 4/2013 |
| JP | 2014170735 | 9/2014 |
| JP | 2015522912 | 8/2015 |
| WO | 2018061458 | 4/2018 |

OTHER PUBLICATIONS

"Office Action of Japan Counterpart Application" with English translation thereof, dated Mar. 8, 2022, p. 1-p. 6.

* cited by examiner

*Primary Examiner* — Victoria H Lynch
(74) *Attorney, Agent, or Firm* — JCIPRNET

(57) ABSTRACT

Provided is an all-solid-state battery cell by which a battery module with good cooling efficiency can be obtained. The battery cell has a configuration in which an all-solid-state battery cell not using an electrolytic solution is used, a heat transfer material is disposed on a lower surface of an electrode laminate inside the battery cell, and heat is conducted from the heat transfer material through an exterior material to be dissipated.

6 Claims, 2 Drawing Sheets

ALL-SOLID-STATE BATTERY CELL

CROSS REFERENCE TO RELATED APPLICATIONS

This application claims the priority benefit of Japanese Patent Application No. 2019-005013, filed on Jan. 16, 2019. The entirety of the above-mentioned patent application is hereby incorporated by reference herein and made a part of this specification.

BACKGROUND

Technical Field

The disclosure relates to an all-solid-state battery cell. More specifically, the disclosure relates to an all-solid-state battery cell by which a battery module with good cooling efficiency can be obtained.

Related Art

Conventionally, as a secondary battery having high energy density, a lithium ion secondary battery has been widely used. The lithium ion secondary battery has a structure in which a separator is present between a positive electrode and a negative electrode and liquid electrolyte (electrolytic solution) is filled.

The electrolytic solution of the lithium ion secondary battery is usually a flammable organic solvent, and thus there are cases where safety against heat is particularly problematic. Therefore, a solid battery is proposed which uses an inorganic solid electrolyte instead of the organic liquid electrolyte (see patent literature 1: Japanese Patent Application Laid-Open No. 2000-106154).

The solid secondary battery includes a solid electrolyte layer as an electrolyte layer between the positive electrode and the negative electrode, and a plurality of the configurations with the positive electrode, the solid electrolyte, and the negative electrode is laminated to configure one battery cell. Compared with the battery using the electrolytic solution, the solid battery configured by the solid electrolytes can eliminate the heat problem and be increased in capacity and/or voltage by lamination, and can also meet a demand for compactness.

Here, the conventional liquid secondary battery filled with the liquid electrolyte (the electrolytic solution) has, for the purpose of suppressing temperature rise inside the battery and securing safety, a cooling structure in which the heat generated in the cell is transferred through metal being an exterior material of the cell and is dissipated to a cooling medium present outside the cell.

FIG. 2 shows a battery module structure in which the conventional electrolytic solution type battery cell is used. In a battery cell 40 configuring a battery module 30 shown in FIG. 2, an electrode laminate 32 is enclosed in an exterior material 31. The electrode laminate 32 includes a current collecting tab 33 extending from an end portion, and the current collecting tab 33 is connected to a terminal 34 at the end portion of the battery cell 40.

In the electrolytic solution type battery cell 40 shown in FIG. 2, an electrolytic solution 35 is filled inside the exterior material 31, and the electrolytic solution 35 is accumulated at a lower portion of the exterior material 31 due to gravity.

In the battery module 30 shown in FIG. 2, a first heat transfer material outside cell 36, a lower plate 37, a second heat transfer material outside cell 38, and a refrigerant 39 are disposed in order at the lower portion of the battery cell 40.

In the conventional electrolytic solution type battery cell 40 configuring the battery module 30 shown in FIG. 2, the electrode laminate 32 is enclosed upright in a Y-axis direction in the diagram, and a lamination direction of the electrode laminate 32 is an X-axis direction (not shown). The electrolytic solution 35 is injected from an upper portion of the cell and is injected excessively beyond a space of the electrode from the viewpoint of maintaining durability of the battery, and thus the electrolytic solution 35 is accumulated at a lower portion of the battery cell 40 due to gravity.

In the battery module 30 shown in FIG. 2, the battery cell 40 is cooled by a method of transferring heat from a lower surface of the battery cell 40. That is, the heat generated inside the battery cell 40 is dissipated through a heat transfer path P31 indicated by an arrow in FIG. 2.

Specifically, the heat generated inside the battery cell 40 moves from a center of the electrode laminate 32 in a direction of a lamination surface of the electrode laminate 32 (the Y-axis direction in the diagram) toward the lower portion of the battery cell 40, and reaches the accumulated electrolytic solution 35.

Here, since the electrolytic solution 35 has low thermal conductivity, the accumulated electrolytic solution 35 inhibits the heat conduction. Thus, the travel direction of the heat is bent before the accumulated electrolytic solution 35 and detours to the exterior material 31, and then the heat passes through the exterior material 31 to enter the first heat transfer material outside cell 36 which is laminated and disposed in the lower portion of the battery cell 40, and reaches the refrigerant 39 through the lower plate 37 and the second heat transfer material outside cell 38.

Here, the heat conduction of the electrode laminate is better in the direction of the lamination surface of the laminate than in the lamination direction. Therefore, in the battery module with the conventional structure in which the travel direction is bent by the accumulated electrolytic solution 35 and the lamination direction of the electrode laminate must be used as a heat transfer path, the heat is conducted through a path with poor thermal conductivity, and the cooling efficiency is poor. Furthermore, the heat transfer path P31 shown in FIG. 2 is forced to be detoured due to the accumulated electrolyte solution 35, and thus a heat transfer distance becomes long, and the cooling efficiency also decreases from this point.

In addition, in the conventional electrolytic solution type battery cell 40 configuring the battery module 30 shown in FIG. 2, a space S is required as a gas accumulation space for injecting the electrolytic solution and ensuring safety.

In the battery module, usually, much heat is generated in a terminal portion or a tab portion, and thus cooling of these portions is also required. However, in the battery module 30 shown in FIG. 2, the heat generated in the terminal 34 or the current collecting tab 33 moves to the inside of the battery cell 40 through a heat transfer path P32 indicated by an arrow in FIG. 2, and then is dissipated by the heat transfer path P31.

That is, because of the presence of the space S, when the heat moves from the terminal 34 to the current collecting tab 33, it is necessary to make a detour, and as a result, the heat transfer distance becomes longer and the cooling efficiency is lowered. In addition, a temperature distribution is easily formed in the Y-axis direction shown in FIG. 2, and temperature control becomes difficult.

As described above, the disclosure provides an all-solid-state battery cell by which a battery module with good cooling efficiency can be obtained.

It is found that the battery module with good cooling efficiency can be configured if an all-solid-state battery cell not using an electrolytic solution is used, a heat transfer material is disposed on a lower surface of an electrode laminate inside the battery cell, and the heat is conducted from the heat transfer material through the exterior material to be dissipated, and the disclosure is accomplished accordingly.

SUMMARY

According to one embodiment, the disclosure provides an all-solid-state battery cell in which an electrode laminate is enclosed into an exterior material. The electrode laminate includes a current collecting tab extending from an end portion. The current collecting tab is connected to a terminal led out from an end portion of the all-solid-state battery cell, and a first heat transfer material is disposed inside the exterior material in a manner of being in contact with the electrode laminate and the exterior material.

DESCRIPTION OF THE EMBODIMENTS

An Embodiment of the disclosure is described below based on the drawings. However, the following examples only illustrate the disclosure, and the disclosure is not limited thereto.

<All-Solid-State Battery Cell>

An all-solid-state battery cell of the disclosure is an all-solid-state battery cell in which an electrode laminate is enclosed into an exterior material, wherein the electrode laminate includes a current collecting tab extending from an end portion, and the current collecting tab is connected to a terminal led out from an end portion of the all-solid-state battery cell. Besides, the all-solid-state battery cell has a structure in which a first heat transfer material is disposed inside the exterior material in a manner of being in contact with the electrode laminate and the exterior material.

Figure 1:
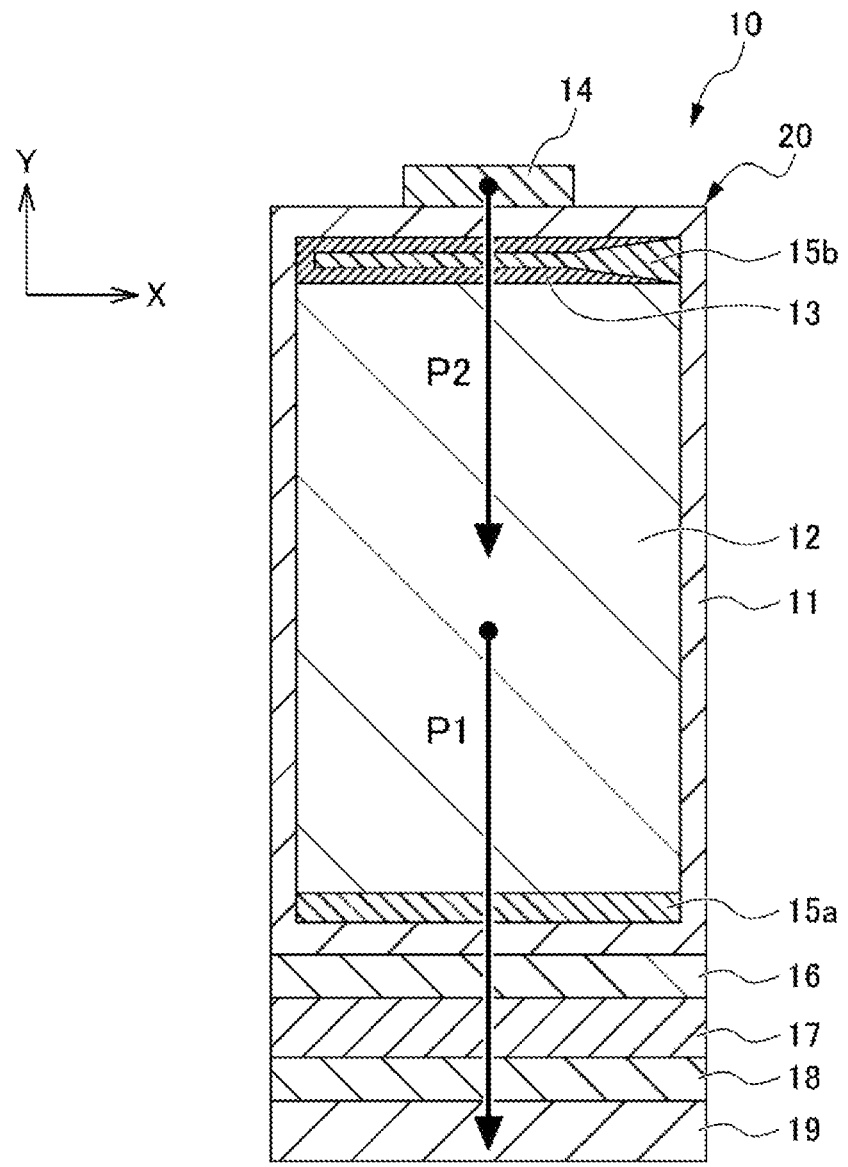
FIG. 1 is a diagram showing a battery module in which an all-solid-state battery cell according to one embodiment of the disclosure is used.

FIG. 1 shows a battery module structure in which the all-solid-state battery cell according to one embodiment of the disclosure is used. In a battery cell 20 configuring a battery module 10 shown in FIG. 1, an electrode laminate 12 is enclosed in an exterior material 11. The electrode laminate 12 includes a current collecting tab 13 extending from an end portion, and the current collecting tab 13 is connected to a terminal 14 at an end portion of the battery cell 20.

In the all-solid-state battery cell 20 according to the embodiment of the disclosure shown in FIG. 1, no electrolytic solution is present inside the exterior material 11. On the other hand, a first heat transfer material 15a is disposed in a manner that is in contact with the electrode laminate 12 and the exterior material 11. The first heat transfer material 15a is arranged in a planar shape along a bottom surface of the exterior material 11.

In the battery module 10 shown in FIG. 1, a first heat transfer material outside cell 16, a lower plate 17, a second heat transfer material outside cell 18, and a refrigerant 19 are disposed in order at a lower portion of the battery cell 20 according to the embodiment of the disclosure.

In the all-solid-state battery cell 20 according to the embodiment of the disclosure which configures the battery module 10 shown in FIG. 1, the electrode laminate 12 is enclosed upright in a Y-axis direction shown in the diagram, and a lamination direction of the electrode laminate 12 is an X-axis direction (not shown).

In the battery module 10 according to the embodiment of the disclosure shown in FIG. 1, the battery cell 20 is cooled by a method of transferring heat from a lower surface of the battery cell 20. That is, the heat generated inside the battery cell 20 is dissipated through a heat transfer path P1 indicated by an arrow in FIG. 1.

Specifically, the heat generated inside the battery cell 20 moves from a center of the electrode laminate 12 in a direction of a lamination surface of the electrode laminate 12 (the Y-axis direction in the diagram) toward the lower portion of the battery cell 20, and reaches the first heat transfer material 15a.

Here, since the first heat transfer material 15a has high thermal conductivity, the first heat transfer material 15a does not inhibit the heat conduction. Thus, the heat directly passes through the first heat transfer material 15a and reaches the exterior material 11. Then, the heat enters the first heat transfer material outside cell 16 which is laminated and disposed in the lower portion of the battery cell 20, and reaches the refrigerant 19 through the lower plate 17 and the second heat transfer material outside cell 18.

The all-solid-state battery cell of the disclosure is characterized in that the first heat transfer material is present inside the exterior material in a manner of being in contact with the electrode laminate and the exterior material. The first heat transfer material is utilized as a heat transfer path between the electrode laminate and the exterior material, and thus a conventional situation in which detour is inevitable due to accumulation of an electrolytic solution can be avoided. Thus, a heat transfer distance is shortened, and the cooling efficiency can be improved.

A material of the first heat transfer material used in the all-solid-state battery cell of the disclosure is not particularly limited as long as the material can conduct the heat generated in the battery cell. In particular, if it is a raw material with higher thermal conductivity than the electrode laminate, the heat can be more efficiently conducted and the cooling efficiency can be improved. In the disclosure, the thermal conductivity of the first heat transfer material is preferably equal to or higher than the thermal conductivity of the electrode laminate in the lamination direction (the X-axis direction in FIG. 1).

In addition, the first heat transfer material used in the all-solid-state battery cell of the disclosure is preferably a material having electrical insulation property. By having electrical insulation property, a short circuit of the battery cell can be prevented.

In addition, the first heat transfer material used in the all-solid-state battery cell of the disclosure is preferably a chemically stable material with respect to the material configuring the electrode laminate. Safety of the battery cell can be improved by using the chemically stable material.

Furthermore, the first heat transfer material used in the all-solid-state battery cell of the disclosure preferably functions as a buffer material. If the first heat transfer material has a function as a buffer material, durability of the battery cell against vibration is improved, which contributes to the durability of the battery module.

Particularly, the all-solid-state battery is less resistant to impacts from the direction perpendicular to the lamination direction (the Y-axis direction in FIG. 1) compared with the lamination direction (the X-axis direction in FIG. 1) and tends to crack more easily. Therefore, by arranging the first heat transfer material in the lamination direction of the electrode laminate to cover an end surface of the electrode laminate, impact resistance of the battery cell can be improved and cracking can be suppressed.

In addition, the thermal conductivity of the electrode laminate is higher in the direction of the lamination surface of the laminate (the Y-axis direction in FIG. 1) than in the lamination direction (the X-axis direction in FIG. 1). Thus, if the first heat transfer material is arranged in the lamination direction of the electrode laminate to cover the end surface of the electrode laminate, the heat can be conducted in the direction in which the thermal conductivity of the electrode laminate is high, and the cooling efficiency can be further improved.

Moreover, when the first heat transfer material is arranged in the lamination direction of the electrode laminate to cover the end surface of the electrode laminate, the first heat transfer material is preferably arranged to be in contact with all electrode layers of the electrode laminate. By being in contact with all the electrode layers, the heat can be conducted to the first heat transfer material directly from all the electrode layers and through a path having high thermal conductivity, and the cooling effect can be further improved.

In the all-solid-state battery cell 20 according to the embodiment of the disclosure shown in FIG. 1, a second heat transfer material 15b is disposed between the current collecting tab 13 and the terminal 14 inside the exterior material 11.

In the all-solid-state battery cell of the disclosure, it is preferable that the second heat transfer material is disposed between the current collecting tab and the terminal inside the exterior material. The arrangement of the second heat transfer material improves the cooling efficiency of the battery cell and facilitates the temperature control.

Generally, in the battery module, much heat is generated at the terminal portion or the tab portion, and cooling is necessary. With respect to this, by disposing the second heat transfer material between the current collecting tab and the terminal, the all-solid-state battery cell of the disclosure can improve the cooling efficiency around the terminal portion or the tab portion.

In addition, by disposing the second heat transfer material between the current collecting tab and the terminal, when the battery cell is used at a low temperature, conversely, the heat generated at the terminal portion can be used, and output characteristics at a low temperature can be improved.

In the all-solid-state battery cell 20 according to the embodiment of the disclosure shown in FIG. 1, the heat generated in the terminal 14 or the current collecting tab 13 moves to the inside of the battery cell 20 through a heat transfer path P2 indicated by an arrow in FIG. 1, and then the heat is dissipated through the heat transfer path P1.

Figure 2:
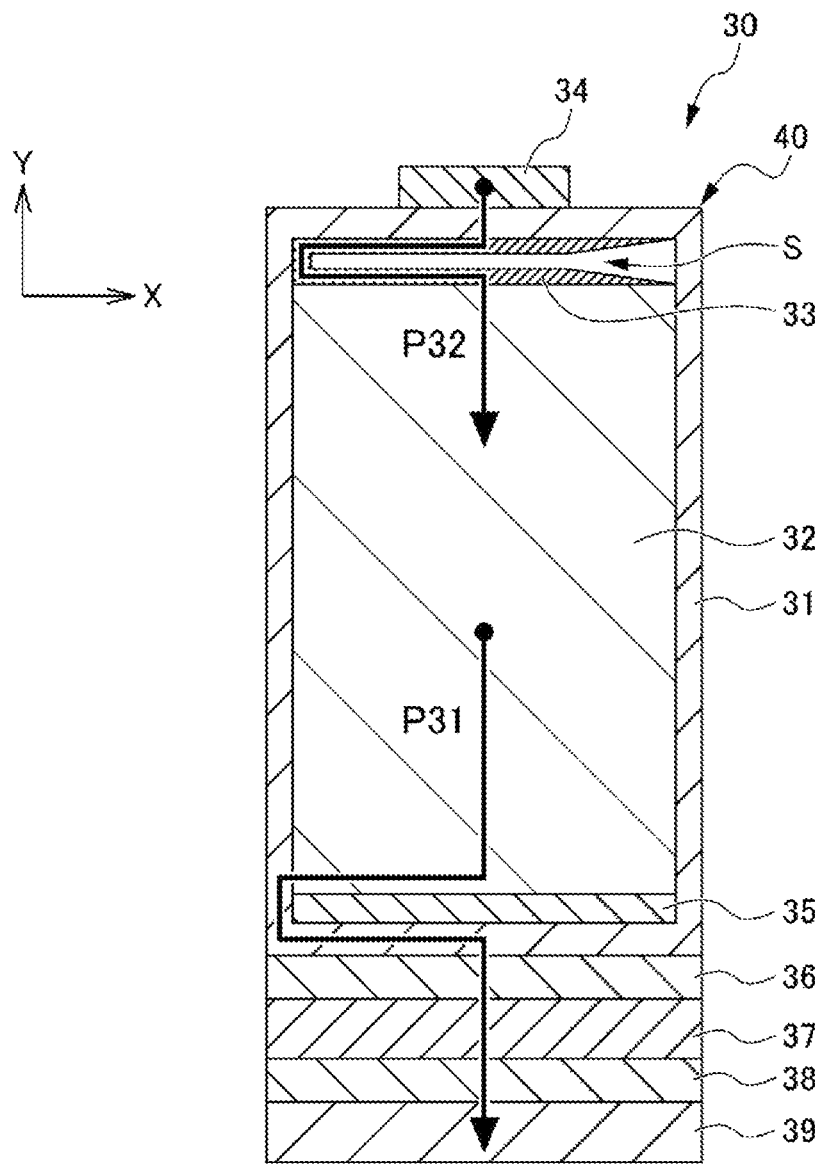
FIG. 2 is a diagram showing a battery module in which a conventional electrolytic solution type battery cell is used.

That is, when the all-solid-state battery cell of the disclosure includes the second heat transfer material between the current collection tab and the terminal inside the exterior material, the second heat transfer material is utilized as a heat transfer path between the current collecting tab and the terminal. Thus, the inevitable detour caused by a space S (the space S in FIG. 2) required to inject the electrolytic solution and secure safety in the conventional electrolytic solution type battery cell can be avoided, and as a result, the heat transfer distance is shortened and the cooling efficiency can be improved.

Moreover, the second heat transfer material is preferably disposed in the space S (the space S in FIG. 2) for injecting the electrolytic solution and securing safety in the conventional electrolytic solution type battery cell.

Thereby, a space unnecessary for the all-solid-state battery cell can be utilized, and an increase in the volume of the battery module due to the arrangement of the heat transfer material can be prevented. Therefore, a decrease in the energy density of the battery is prevented and the cooling efficiency can be improved.

<Other Configurations>

According to one embodiment, the disclosure provides an all-solid-state battery cell in which an electrode laminate is enclosed into an exterior material. The electrode laminate includes a current collecting tab extending from an end portion. The current collecting tab is connected to a terminal led out from an end portion of the all-solid-state battery cell, and a first heat transfer material is disposed inside the exterior material in a manner of being in contact with the electrode laminate and the exterior material.

The first heat transfer material may be disposed along at least one surface of the exterior material.

The first heat transfer material may be arranged in a lamination direction of the electrode laminate.

A cooling system may be disposed on a back side of the surface of the exterior material on which the first heat transfer material is disposed.

A second heat transfer material may be further disposed between the current collecting tab and the terminal.

The second heat transfer material may be disposed in a space of the all-solid-state battery cell.

In the all-solid-state battery cell of the disclosure, by disposing the heat transfer material on the lower surface of the electrode laminate, the heat is conducted without passing through a detour path, and thus the battery cell can be efficiently cooled. As a result, heat accumulation in the center of the cell which has been a conventional problem is suppressed, and the battery module using the all-solid-state battery cell of the disclosure is improved in durability.

In addition, because the heat accumulation in the center is suppressed, the lamination number of the electrode laminates can be increased, and energy density of the battery cell can be improved.

Furthermore, because the cooling efficiency is improved, capacity of the cooling system included in the module can be lowered, and the cost can be reduced as a result.

Furthermore, because weight and volume of the cooling system can be reduced, weight and size of the entire battery module can be reduced, and the energy density can be increased.

In the all-solid-state battery cell of the disclosure, configurations other than the above configurations are not particularly limited. Materials, methods, and the like known in the field of battery can be applied.

What is claimed is:

1. An all-solid-state battery cell in which an electrode laminate is enclosed into an exterior material, wherein
the electrode laminate comprises a current collecting tab extending from an end portion,
the current collecting tab is connected to a terminal led out from the end portion of the all-solid-state battery cell,
a first heat transfer material is disposed inside the exterior material in a manner that is in contact with the electrode laminate and the exterior material, and a second heat transfer material is further disposed between the current collecting tab and the terminal, wherein the first heat transfer material is arranged in a lamination direction of the electrode laminate to cover an end surface of the electrode laminate.

2. The all-solid-state battery cell according to claim 1, wherein the first heat transfer material is disposed along at least one surface of the exterior material.

3. The all-solid-state battery cell according to claim 2, wherein a cooling system is disposed on a back side of the surface of the exterior material on which the first heat transfer material is disposed.

4. The all-solid-state battery cell according to claim 1, wherein a cooling system is disposed on a back side of the surface of the exterior material on which the first heat transfer material is disposed.

5. The all-solid-state battery cell according to claim 1, wherein the second heat transfer material is disposed in a space of the all-solid-state battery cell.

6. The all-solid-state battery cell according to claim 1, wherein the first heat transfer material is arranged to be in contact with all electrode layers of the electrode laminate.

\* \* \* \* \*